United States Patent
Scholz

(10) Patent No.: US 11,866,143 B2
(45) Date of Patent: Jan. 9, 2024

(54) DRIVE SYSTEM FOR A SHIP

(71) Applicant: SCHOTTEL GMBH, Spay/Rhein (DE)

(72) Inventor: Sascha Scholz, Rösrath (DE)

(73) Assignee: SCHOTTEL GMBH, Spay / Rhein (DE)

( * ) Notice: Subject to any disclaimer, the term of this patent is extended or adjusted under 35 U.S.C. 154(b) by 2 days.

(21) Appl. No.: 17/054,971

(22) PCT Filed: Apr. 11, 2019

(86) PCT No.: PCT/EP2019/059205
§ 371 (c)(1),
(2) Date: Nov. 12, 2020

(87) PCT Pub. No.: WO2019/219305
PCT Pub. Date: Nov. 21, 2019

(65) Prior Publication Data
US 2021/0214063 A1 Jul. 15, 2021

(30) Foreign Application Priority Data
May 14, 2018 (DE) .............. 10 2018 111 402.8

(51) Int. Cl.
| | |
|---|---|
| B63B 27/36 | (2006.01) |
| B63H 5/08 | (2006.01) |
| B63J 3/02 | (2006.01) |
| B63H 23/30 | (2006.01) |
| B63H 21/20 | (2006.01) |
| B63H 23/06 | (2006.01) |

(52) U.S. Cl.
CPC .............. *B63H 5/08* (2013.01); *B63J 3/02* (2013.01); *B63B 27/36* (2013.01); *B63H 23/30* (2013.01);
(Continued)

(58) Field of Classification Search
CPC .. B63H 5/125; B63H 2023/062; B63H 23/10; B63H 23/12; B63H 23/18; B63H 5/08;
(Continued)

(56) References Cited

U.S. PATENT DOCUMENTS

| | | | |
|---|---|---|---|
| 9,732,807 B1 * | 8/2017 | Logan | B63H 23/30 |
| 2006/0089062 A1 * | 4/2006 | Carr | B63H 5/08 440/75 |

(Continued)

FOREIGN PATENT DOCUMENTS

| | | |
|---|---|---|
| CH | 379313 A | 6/1964 |
| DE | 36 23 980 A1 | 2/1988 |
| DE | 297 12 368 U1 | 10/1997 |
| DE | 100 34 656 A1 | 1/2002 |

(Continued)

OTHER PUBLICATIONS

European Patent Office, English language version of the International Search Report, Form PCT/ISA/210 for International Application PCT/EP2019/059205, dated Jul. 24, 2019 (3 pages).

*Primary Examiner* — Andrew Polay
(74) *Attorney, Agent, or Firm* — Pauley Erickson & Swanson

(57) ABSTRACT

A drive system for a ship, including at least two propulsion units, each propulsion unit having a propeller and a drive engine with an above-water transmission connected downstream for driving the propeller. Each drive engine can be connected to and disconnected from the associated above-water transmission with a clutch and between the above-water transmissions, a switchable drive train is provided by which in one switching state, the above-water transmissions can be coupled and driven jointly and in another switching state, they can be decoupled from each other.

15 Claims, 4 Drawing Sheets

(52) U.S. Cl.
CPC .. *B63H 2021/202* (2013.01); *B63H 2023/062* (2013.01)

(58) Field of Classification Search
CPC .......... B63H 5/1252; B63H 2005/1254; B63H 23/14; B63H 23/16; B63C 7/16; B63B 27/00; B63B 41/00; B63B 2027/165; B63B 27/36; B63G 8/001; B63G 2008/004; B63G 2008/007; B63G 2008/008; B66C 13/02; B66C 23/52
See application file for complete search history.

(56) References Cited

U.S. PATENT DOCUMENTS

2008/0182466 A1\* 7/2008 Wegner-Donnelly ...... B63J 3/04
440/84
2012/0129411 A1 5/2012 Kodera et al.

FOREIGN PATENT DOCUMENTS

| | | | | |
|---|---|---|---|---|
| EP | 0249208 | \* | 6/1987 | |
| EP | 0 246 631 A1 | | 11/1987 | |
| EP | 0 249 208 A1 | | 12/1987 | |
| FR | 586050 | \* | 10/1908 | ............. B63H 23/32 |
| FR | 586050 A | \* | 3/1925 | ............. B63H 21/14 |
| FR | 586050 A | | 3/1925 | |
| GB | 926560 A | | 5/1963 | |
| GB | 1 269 043 A | | 3/1972 | |
| JP | H08-40369 A | | 2/1996 | |
| JP | 2017-132442 A | | 8/2017 | |
| RU | 2 499 726 C2 | | 11/2013 | |

\* cited by examiner

DRIVE SYSTEM FOR A SHIP

BACKGROUND OF THE INVENTION

Field of the Invention

This invention relates to a drive system for a ship, including at least two propulsion units, each propulsion unit having a propeller and a drive engine with an above-water transmission connected downstream for driving the propeller.

Discussion of Related Art

Depending on the type of transportation or work they perform, ships are used in very different ways. In this connection, in each trip by each ship, there are often changing modes of use and operation, for example berthing and casting off, positioning, slow travel, rapid travel, dynamic positioning, towing or pushing, traveling with or without cargo, and special tasks such as firefighting, in which low to very high propulsion outputs of the drive system are respectively required for a range of durations from short to long.

For the locomotion of a ship, the drive system includes propulsion units in which a drive engine, which can be embodied for example as an internal combustion engine or an electric motor, drives at least one propeller positioned below the water surface and in this way, generates thrust for moving the ship. To adapt and improve these propulsion units, different energy sources are used for the internal combustion engines, for example diesel, heavy fuel, and gas, actively adjustable propellers, step-down/step-up transmissions, deflection transmissions, summation transmissions, simple or variable clutches, electric transformers, generators, electric motors, batteries, and different control systems.

In order to handle the changing of the operating modes of a ship in the most optimal possible way, there are various known propulsion units, which differ with regard to their efficiency, operating costs, maintenance frequency, complexity, space requirements, and the like. Because of the many required components, the known propulsion units are often very complex, involve very high investment and operation costs, and may possibly require a large amount of space for the installation, which, if this space is even available, is accompanied by a loss of cargo space.

In addition, modern ships are subject to ever stricter requirements and laws with regard to the emissions such as $CO_2$, $NO_x$, $SO_x$, etc. produced by the ship, which must be taken into account in the drive system. It is also necessary to ensure compliance with requirements and laws in every possible operating mode of the ship. At the same time, both the investment costs and the operating costs, primarily fuel consumption and maintenance costs, should be minimized. The known drive systems achieve this only inadequately.

One particular problem is the design of the drive system for a tugboat, which is also referred to for short as a tug. Such tugs are used for positioning other vessels, which, because of their technical equipment, are not able to achieve precise positioning themselves or which, according to regulations and laws, are required to be assisted by tugs in order to execute particular maneuvers such as berthing and cast-off maneuvers in a harbor.

The operation of such a tug has a low required propulsion output for a very high percentage of the time, for example, in transit between use positions or when waiting for a tugging task, and a much higher propulsion output than this for a very low percentage of the time, which is required during actual tugging. But since ultimately, the available high propulsion output is determined by the dimensions and power of the drive system, for the vast majority of the time during which they are being operated, such tugs are equipped with drive systems that are oversized and problematic in terms of both efficiency and emissions.

In addition, such tugs mostly operate only in harbors or in close proximity to the coast and must therefore often also have the ability to be used as firefighting vessels in, for example, fire emergencies and for this purpose, are also equipped with a complex firefighting system, which must also be driven by the drive system as needed. The drive system of the tug is thus significantly more complex than would be the case for the actual work of a tug.

As a rule, modern tugs are equipped with at least two propellers, which are generally embodied as azimuth thrusters that can be infinitely controlled around the vertical axis, for example, in the form of rudder propellers or Z-drives. A large part of the maintenance costs of a ship and in particular of a tug involves the installed internal combustion engines and these in turn depend largely on their operation time. It is thus necessary to minimize the operation time of the drive engines and the resulting maintenance costs.

SUMMARY OF THE INVENTION

One object of this invention is to provide a drive system for a ship of the type mentioned at the beginning, which overcomes the disadvantages of the prior art and features reduced complexity and therefore reduced maintenance requirements and attendant costs and requires only a small amount of space.

To attain this object and others, this invention proposes a drive system as discussed in this specification and the claims. Advantageous embodiments and modifications of this invention are discussed in the dependent claims.

One proposal according to this invention is based on the fact that the drive system includes at least two propulsion units and each drive engine can be connected to and disconnected from the associated above-water transmission by a clutch so that depending on the switching state of the clutch, a torque-transmitting connection between the drive engine and the above-water transmission is either produced or eliminated. According to this invention, between the above-water transmissions, an additional switchable drive train is provided by which in one switching state, the above-water transmissions can be coupled and driven jointly and in another switching state, they can be decoupled from each other.

According to this invention, the two propulsion units can each have an above-water transmission with two power intakes instead of only one as is usually provided. One power intake can be switchably connected to the associated drive engine in the usual way and by the additional drive train, the other power intake can be mechanically coupled or connected in a torque-transmitting way to the corresponding other power intake of the adjacent above-water transmission of the nearest propulsion unit.

This modification of the drive system, which is only slight in terms of its complexity and space requirements, through the addition of another switchable drive train between the above-water transmissions offers, in a surprisingly simple way, additional drive modes that in particular satisfy the widely fluctuating demands of a tug to a significant degree.

It is thus possible, when only a small amount of propulsion output is required, for example, in transit mode or when waiting or during dynamic positioning of a tug equipped with two propulsion units, to switch off one of the two drive engines and with the aid of the provided switchable clutch, to decouple it from the associated above-water transmission and to couple the two above-water transmissions via the switchable drive train so that they are driven jointly by the drive engine that remains in operation. It is clear that this makes it possible to significantly reduce operating hours of the switched off drive engine and thus its fuel demand. At the same time, the remaining jointly driven drive engine can be operated with a correspondingly higher power demand and thus closer to its optimal operating conditions without the loss of propulsion output in this partial load range.

But if maximum propulsion output is required, for example, in order to perform a tugging task, then the connection of the two above-water transmissions via the switchable drive train is decoupled and thus eliminated and each propulsion unit is driven separately in the usual way by its own drive engine with the available maximum output because the direct connection between drive engine and the above-water transmission, which has previously been eliminated, is reestablished.

The possibility according to this invention of jointly driving the two above-water transmissions with their associated propellers by only one drive engine also offers a higher operational reliability since the ship equipped with the drive system according to this invention remains fully maneuverable even with the failure of one drive engine.

If the above-water transmissions are coupled by the connected drive train and are jointly driven by only one drive engine, then the invention also offers the possibility of using the non-coupled, so to speak freed-up drive engine for other purposes, for example to drive an auxiliary unit. Such an auxiliary unit can, for example, be a generator for producing electrical energy for charging batteries of a hybrid drive system or a fire pump so that it is possible, for example, when a tug is used as a firefighting vessel, to use one drive engine and the coupled above-water transmissions for positioning and to use up to 100% of the other drive engine's output to drive the fire pump.

According to one embodiment of this invention, the drive train is embodied as a drive shaft with at least one switchable clutch between an above-water transmission and the drive shaft, which places only slight design demands on the embodiment according to this invention. According to a modification, it is also possible to provide two synchronously switchable clutches between the above-water transmissions and the drive shaft. Through the use of synchronously switchable clutches between each above-water transmission and the drive shaft, it is also possible to selectively use each of the available drive engines for jointly driving the coupled above-water transmissions.

According to another embodiment of this invention, the drive shaft can also be equipped with a drive engine that is operatively connected to it. Any engine type can be conceivably used as the drive engine, such as an internal combustion engine or electric motor, with the latter optionally also being operable as an electric generator. In the case of an electric generator, it is possible, with jointly driven and coupled above-water transmissions to also produce electrical energy, which can be fed into the electrical system of the ship and/or used to charge batteries for an electric drive engine.

If an electric motor is operatively connected to the drive shaft, then in a particularly simple way, this yields a hybrid drive, which makes it possible to also decouple the two drive engines of the propulsion units from the respectively associated above-water transmissions and to drive the two above-water transmissions in a purely electrical mode by the coupled drive shaft of the drive train. In addition, one drive engine of the propulsion units can also be operated coupled for driving both of the above-water transmissions while the electric motor can be used to produce additional torque on the drive shaft of the drive train.

The above-mentioned operating modes can be combined if a combined motor/generator on the drive shaft is used, which can function both as a drive engine and as an electric generator.

According to another embodiment of this invention, the propulsion units are embodied as azimuth thrusters, for example, in the form of rudder propellers. In this connection, it is also advantageous if the ship has a hull floating in the water along a water line and the propeller of each propulsion unit is positioned under the water line and the drive engine and the above-water transmission are positioned inside the hull so that the switchable drive train, which is provided according to this invention, can also be provided inside the hull.

The possibility according to this invention for coupling the above-water transmissions by a switchable drive train is accompanied in that the coupled switching state, the two above-water transmissions are driven in the opposite rotation direction. In response to this, an opposite blade angle of the propellers can be used, but this also requires a corresponding design of the individual drive engines.

According to another embodiment of this invention, however, the drive train can also be embodied with a reversing gear, which is integrated, for example, into the drive train, which is embodied, for example, as a drive shaft. Such a reversing gear between the two above-water transmissions produces a rotation direction reversal at both of its transmission inputs and outputs so that both of the above-water transmissions are driven in the same rotation direction.

For example, such a reversing gear can be embodied in a coaxial design or with axially offset shafts and, for example, can include bevel gears or cylindrical gears.

According to another embodiment of this invention, at least one switchable clutch can be used to couple and decouple the reversing gear to and from the drive train in order to decouple it when not in use, for example, in order to avoid churning losses.

In addition, the positioning of a reversing gear in the drive train according to this invention can also compensate for the inclination of the propulsion units to each other that is often present due to the hull geometry. For example, typical inclinations are about 12° relative to each other. By positioning universal shafts between each above-water transmission and the reversing gear that is preferably positioned in the middle of the drive train, it is easily possible to compensate for such inclinations. Alternatively, the reversing gear can also be directly embodied with correspondingly inclined axes, in which case the transmission housing and the gear set used can be designed and produced in accordance with the inclination of the propulsion units to each other that is present at the installation site.

BRIEF DESCRIPTION OF THE DRAWINGS

Other embodiments and details of this invention are explained below in view of the drawings, which depict exemplary embodiments, wherein.

DETAILED DESCRIPTION OF INVENTION

Figure 1:
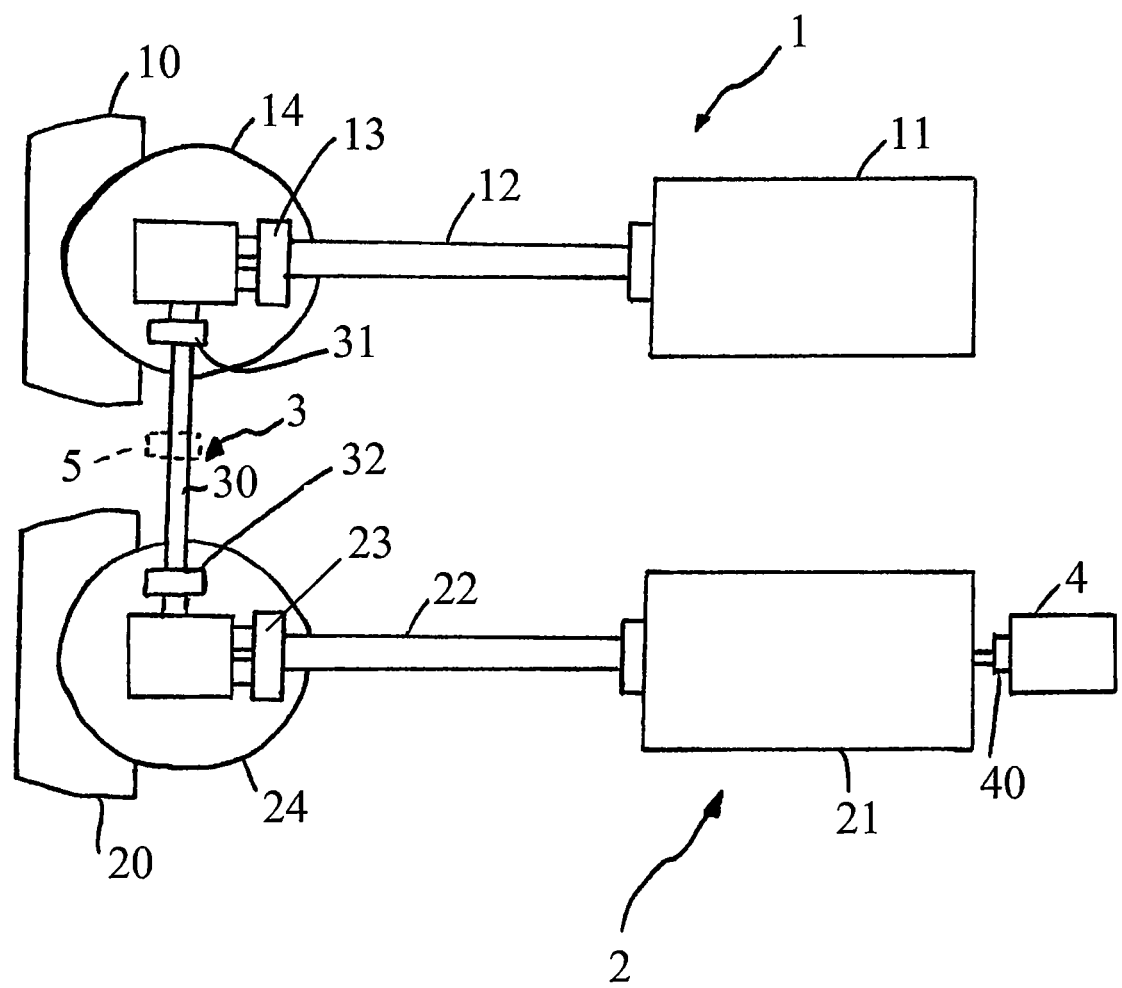
FIG. 1 shows a schematic view of a first embodiment of a drive system according to this invention.

FIG. 1 shows a schematic view of a drive system for a ship, for example, a tug, which comprises two essentially identically designed propulsion units 1, 2 that are each embodied as a rudder propeller.

In a manner that is not shown in detail, each of these propulsion units 1, 2 comprises a propeller 10, 20 positioned under the water line, of which only the surrounding duct is visible in the exemplary embodiment shown, and an above-water transmission 14, 24, which is connected to the propeller 10, 20 and is typically positioned inside the hull. Each of these above-water transmissions 14, 24 of the two propulsion units 1 is associated with a drive engine 11, 21, which is likewise positioned inside the hull and can be embodied, for example, as a diesel internal combustion engine. The drive engine 11, 21 transmits its propulsive force or torque to the respective above-water transmission 14, 24 via a main drive shaft 12, 22.

In an intrinsically known way, the drive is thus conveyed approximately in a Z shape when viewed from the side and is deflected twice by 90° each time between the drive engine 11, 21 and the respective propeller 10, 20. In this case, a vertical shaft, which is not shown in the drawings, extends between the above-water transmission 14, 24 and the propeller 10, 20 and is routed from the above-water transmission 14, 24 out from the hull to the propeller axle, which is not shown.

By means of its main drive shaft 12, 22, the drive engine 11, 21 is respectively connected to a first power intake of the above-water transmission 14, 24 via a switchable clutch 13, 23. In one switching position of the clutch 13, 23, a non-positive, frictional connection is produced between the drive engine 11, 21 with the main drive shaft 12, 22 and the respective above-water transmission 14, 24 and in an intrinsically known way, the drive engine 11, 21 separately drives the associated propeller 10, 20 via the respective above-water transmission 14, 24 of each individual propulsion unit 1, 2. In another switching position of the clutch 13, 23, this non-positive, frictional connection between the drive engine 11, 21 and the respective above-water transmission 14, 24 is eliminated, such as the drive engine 11, 21 does not transmit any forces or moments to the above-water transmission 14, 24 connected downstream.

In addition, each above-water transmission 14, 24 is embodied with another shaft end, which is used both as a power intake and as a power output, to which a switchable clutch 31, 32 is fastened. Between the two switchable clutches 31, 32, a drive shaft 30 extends, which together with the clutches 31, 32 flange-mounted to the ends, forms a drive train 3 connecting the two above-water transmissions 14, 24.

The two clutches 31, 32 of the drive train 3 are positioned so that they can be switched synchronously, such as each with the same switching state. In one switching state of the clutches 31, 32, with their respective additional power intakes, the two above-water transmissions 14, 24 are coupled to each other via the drive shaft 30 of the drive train 3 so that forces and moments are transmitted between the two above-water transmissions 14, 24 via the drive train 3. In the other switching state of the clutches 31, 32, the coupling of the two above-water transmissions 14, 24 is eliminated and no forces and moments are transmitted between the two above-water transmissions 14, 24 via the drive train 3.

Alternatively, it is possible for only one switchable clutch 31 or 32 to be provided in one of the two above-water transmissions 14, 24 and for it to be used for producing the detachable connection to the drive shaft 30. If only one such clutch 31, 32 is provided, then the drive shaft 30 can harmlessly rotate in sympathetic fashion when the clutch 31, 32 is disengaged, with the two above-water transmissions 14, 24 being decoupled nevertheless.

It is also clear that the drive engine 21, which is associated with the propulsion unit labeled with reference numeral 2, on its side oriented away from the main drive shaft 22, also drives an auxiliary drive 4 such as a fire pump via a switchable clutch 40.

Figure 2A:
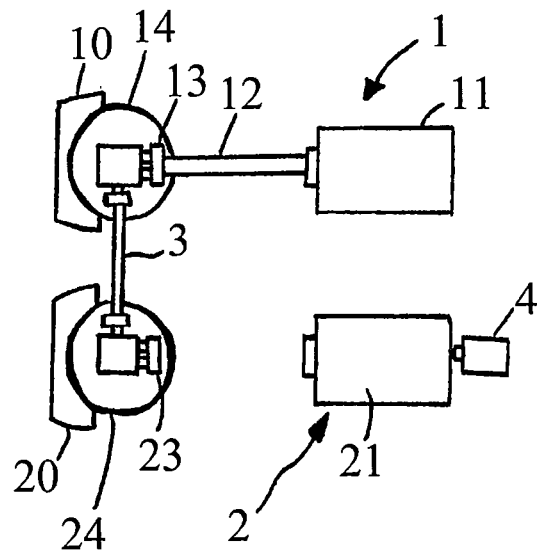
FIG. 2a shows the drive system according to FIG. 1, in a first switching state.
Figure 2B:
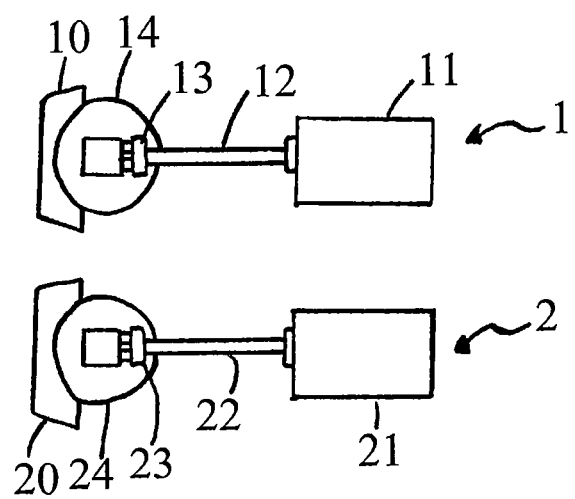
FIG. 2b shows the drive system according to FIG. 1, in a second switching state.

This configuration, which is shown in FIG. 1 and explained above, achieves the operating modes that are schematically depicted in FIGS. 2a and 2b.

In an operating mode according to FIG. 2a, the vessel that is equipped with the drive system shown, for example, a tug, is operated with only a low or partial demand of the maximum propulsion output, as is the case, for example, in transit between tug applications or when waiting and during dynamic positioning operation.

In the exemplary embodiment shown, the clutches 31, 32 of the drive train 3 are engaged and the drive train 3 transmits forces and moments between the two above-water transmissions 14, 24. The clutch 13 in the above-water transmission 14 is likewise engaged and connects this above-water transmission 14 to the main drive shaft 12 of the drive engine 11 of the propulsion unit 1 in the usual way. The clutch 23 of the propulsion unit 2, by contrast, is disengaged so that the drive engine 21 does not exert any drive on the above-water transmission 24 in connection with the propulsion unit 2. This is shown in FIG. 1 in that the main drive shaft 22 used for transmitting torque is not visible in FIG. 1. But this is only intended to symbolize the lack of force and moment flow, which is achieved by the disengaged clutch 23.

Consequently, in the operating state according to FIG. 2a, the two propellers 10, 20 are jointly driven in accordance with the force demand only by the drive engine 11 of propulsion unit 1 in that the two propellers 10, 20 are coupled in series, so to speak, via the additional drive train 3. In this case, the above-water transmission 14 receives 100% of the propulsion output exerted by the drive engine 11 via the main drive shaft 12 and the engaged clutch 13 at the power intake that is connected to the clutch 13, but via the additional power intake that is connected to the clutch 31 according to FIG. 1, transmits only about 50% of this propulsion output to the drive train 3 and the power intake, which is connected to the clutch 32, of the above-water transmission 24 of propulsion unit 2 and ultimately, the latter's propeller 20.

Meanwhile, the drive engine 21 of the $2^{nd}$ propulsion unit 2 can be switched off in order to reduce fuel consumption and the operating hours. It is clear that with such a connection of the propellers 10, 20 and their respective above-water transmissions 14, 24 to only one drive engine 11 by means of the drive train 3 achieves a significantly more reasonably priced and less maintenance-intensive operation than would be the case when operating with both of the drive engines 11, 21, each in its lower partial load range.

With the configuration according to FIG. 2a, there is also the possibility for the drive engine 21 of the propulsion unit 2, which is not needed to drive the propeller 10, 20, to be used for another purpose, for example up to its full power, to drive an auxiliary unit 4 such as a fire pump. Firefighting applications generally require only dynamic positioning, meaning that the jointly connected drive by means of the drive engine 11 is sufficient, leaving the free drive engine 21 available up to its full power for operation of the fire pump 4. This therefore significantly reduces the complexity of the firefighting equipment.

By contrast, if the vessel requires the full propulsion output, for example, when a tug is being used for a tugging application, the drive train 3 that connects the above-water transmissions 14, 24 is decoupled by synchronously disengaging the two clutches 31, 32. This then produces the conventional configuration of the propulsion units 1, 2 that is shown in FIG. 2b, in which each drive engine 11, 21 separately and with maximum power, drives the respectively associated propeller 10, 20 directly and immediately via the main drive shaft 12, 22 and the respective above-water transmission 14, 24 when the clutch 13, 23 is engaged.

Instead of using the drive engine 11 of propulsion unit 1 for jointly driving the propellers 10, 20 by means of the drive train 3, the drive engine 21 of propulsion unit 2 can also be used because the drive of propulsion unit 1 can also be decoupled by means of the clutch 13. It is thus also possible, for example, in the event of a failure of the drive engine 11, for the vessel to be driven in a fully maneuverable fashion with both propellers 10, 20 by means of the drive engine 21 of propulsion unit 2.

Likewise, it is also possible for the entire design of the drive system to be laid out in mirror-image fashion and instead of the drive engine 21, for drive engine 11 to be provided with an auxiliary unit 4 or auxiliary drive. All of the above explanations therefore apply correspondingly, with drive engine 11 being replaced with 21 and vice versa with drive engine 21 being replaced with drive engine 11.

Figure 3:
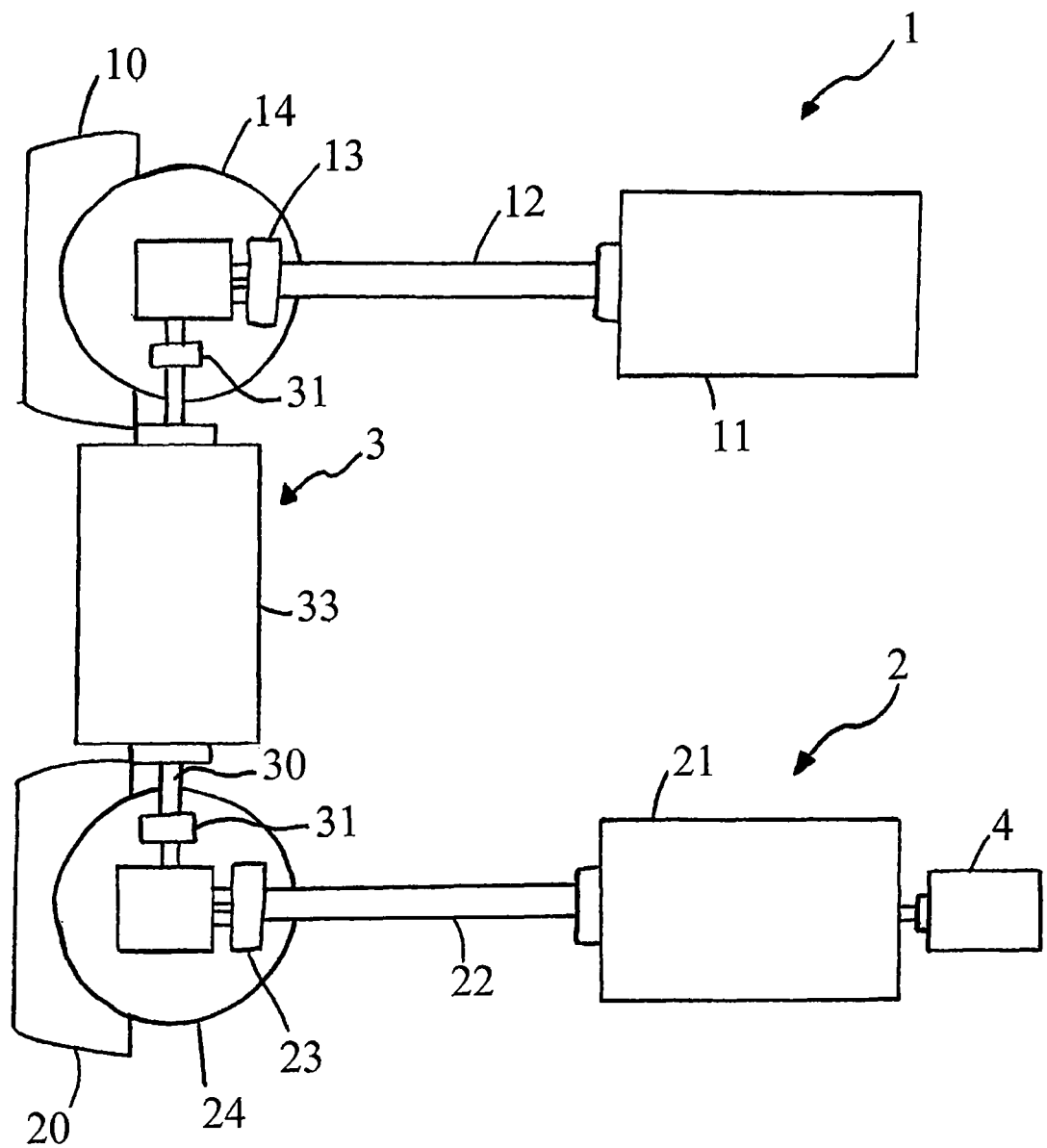
FIG. 3 shows a schematic view of another embodiment of a drive system according to this invention.

In the exemplary embodiment in FIG. 3, an embodiment is shown that contrasts with the above-explained exemplary embodiment according to FIGS. 1 and 2a to 2b. Parts that remain the same have been provided with the same reference numerals and in order to avoid repetition, are not explained again separately if this is not required for comprehension of the embodiment.

By contrast with the exemplary embodiment according to FIG. 1, in the vicinity of or near the switchable drive train 3, the exemplary embodiment according to FIG. 3 has a drive engine 33 additionally mounted on the drive shaft 30, in this case an electric motor, which can exert the corresponding drive output on the drive shaft 30.

If in a configuration shown in FIG. 2a, the drive system is operated with only one drive engine 11 coupled via the drive train 3 for driving the two propellers 10, 20, then the drive engine 33 can be used to introduce additional torque up to approximately equal parts into the above-water transmissions 14, 24 in order to drive the propellers 10, 20.

It is also possible, in a departure from the embodiment according to FIG. 2a, to also disengage the clutch 13 so that both of the drive engines 11, 21 are decoupled. In this case, the electric motor 33 can be used to produce a synchronous, purely electric drive of both propellers 10, 20 so that the drive system also enables a hybrid mode with a purely electrical drive mode, which is advantageous or required within harbors for emissions protection reasons.

If the electric motor 33 is also embodied as a motor/generator, then when the drive train 3 is coupled and the drive is being provided by one or both drive engines 11, 21, it is possible to produce electrical energy in the drive train 3, which can be used, for example, to charge the batteries of the vessel for a subsequent purely electrical drive mode.

Within the scope of this invention, the slight design modification of the switchable drive train 3 between the above-water transmissions 14, 24 achieves a drive system that can be flexibly operated in accordance with the respective requirements of the vessel, particularly in the partial load range that is used far more of the time, a significantly more economical operating mode is enabled without a significant increase in complexity. It is also possible to achieve a hybrid drive mode and the driving of auxiliary units such as firefighting equipment. In view of the added value that can be achieved, the required additional costs of the embodiment according to this invention are extremely low and have only a small influence on the space requirements of the drive system so that even in vessels with very cramped conditions such as tugs, implementation is easily possible.

The switchable coupling of the two above-water transmissions 14, 24, which is shown based on the above explanations regarding FIGS. 1, 2a, and 3, for the purpose of driving by means of only one of the drive engines 11, 21, and/or 33 requires the two above-water transmissions 14, 24 to each be driven with a respectively opposite rotation direction at their inputs that are equipped with clutches 31, 32.

If this is not wanted, for example, because both of the drive engines should have the same rotation direction, then a reversing gear 5 can be provided, for example, in a central position in the drive train 3, which is indicated with dashed lines in FIG. 1 and which divides the drive shaft 30, which is used to embody the drive train 3, into two sections extending on both sides of the reversing gear 5 to a respective above-water transmission 14 and 24, respectively. Such an intrinsically known reversing gear 5 provides a reversal of the rotation direction in both sections so that as a result, the two above-water transmissions 14 are driven in the same rotation direction in the coupled state that is produced by means of the drive train 3.

For example, such a reversing gear 5 can be embodied in a coaxial design or with shafts that have an axial offset and include bevel gears and/or cylindrical gears.

In addition, when not in use, the reversing gear 5 can be deactivated by means of additional clutches, not shown here, in order to avoid unnecessary churning losses when not in use.

Figure 4:
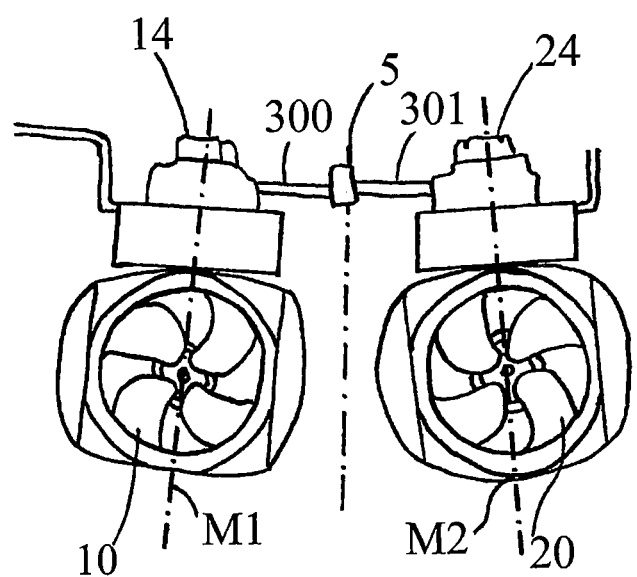
FIG. 4 shows a rear view of a ship equipped with a drive system according to this invention.

Finally, such a reversing gear 5 offers the possibility of compensating for the inclined positioning of propulsion units that is often found in hulls when viewed in the longitudinal axis of the vessel. FIG. 4 schematically depicts the rear view of such a ship in which, due to the hull geometry, the central axes M1, M2 of the two propulsion units with the propellers 10, 20 and above-water transmissions 14, 24 are inclined at an angle of 12° relative to each other.

The reversing gear 5 is positioned approximately in the middle between the above-water transmissions 14, 24 and is connected to the above-water transmissions 14, 24 by way of respective universal shafts 300, 301 to form the drive train 3. In this case, the inclination of the propulsion units to each other is compensated for in a simple way at the reversing gear 5 by means of the universal shafts 300, 301.

The invention claimed is:

1. A drive system for a ship, comprising at least two propulsion units (1, 2), each said propulsion unit (1, 2) having a propeller (10, 20) and a drive engine (11, 21) with an above-water transmission (14, 24) connected downstream for driving the propeller (10, 20), the drive system comprising each drive engine (11, 21) able to be connected to and disconnected from the associated above-water transmission (14, 24) by a clutch (13, 23), and between the above-water transmissions (14, 24), a switchable drive train (3) whereby in one switching state, the above-water transmissions (14, 24) can be coupled and driven jointly and in another switching state can be decoupled from each other, wherein the drive train (3) includes a drive shaft (30) with synchronously switchable clutches (31, 32) between the above-water transmissions (14, 24) and the drive shaft (30), wherein a first of the synchronously switchable clutches (31) is between a first of the above-water transmissions (14) and a first end of the drive shaft (30), and a second of the synchronously switchable clutches (32) is between a second of the above-water transmissions (24) and a second end of the drive shaft (30), and wherein the drive train (3) has a reversing gear (5).

2. The drive system according to claim 1, wherein the drive shaft (30) includes a drive engine (33) operatively connected to the drive shaft (30).

3. The drive system according to claim 2, wherein when the above-water transmissions (14, 24) are connected via the drive train (3), one drive engine (11) is connected to the corresponding above-water transmission (14) and drives the above-water transmissions (14, 24) jointly while the other drive engine (21) is decoupled.

4. The drive system according to claim 3, wherein an auxiliary unit (4) is driven by the decoupled drive engine (21).

5. The drive system according to claim 4, wherein a pump or generator is provided as the auxiliary unit (4).

6. The drive system according to claim 5, wherein the propulsion units (1, 2) each include a rudder propeller.

7. The drive system according to claim 6, wherein the vessel has a hull floating in the water along a water line and the propeller (10, 20) of each propulsion unit (1, 2) is positioned under the water line and the drive engine (11, 21) and the above-water transmission (14, 24) are positioned inside a hull.

8. The drive system according to claim 7, wherein the reversing gear has at least one switchable clutch.

9. The drive system according to claim 8, wherein for the drive train (3), the reversing gear (5) can be connected to the above-water transmissions (14, 24) via universal shafts (300, 301).

10. The drive system according to claim 1, wherein when the above-water transmissions (14, 24) are connected via the drive train (3), one drive engine (11) is connected to the corresponding above-water transmission (14) and drives the above-water transmissions (14, 24) jointly while the other drive engine (21) is decoupled.

11. The drive system according to claim 1, wherein an auxiliary unit (4) is driven by the decoupled drive engine (21).

12. The drive system according to claim 1, wherein the propulsion units (1, 2) each include a rudder propeller.

13. The drive system according to claim 1, wherein the vessel has a hull floating in the water along a water line and the propeller (10, 20) of each propulsion unit (1, 2) is positioned under the water line and the drive engine (11, 21) and the above-water transmission (14, 24) are positioned inside a hull.

14. The drive system according to claim 1, wherein the reversing gear has at least one switchable clutch.

15. The drive system according to claim 1, wherein for the drive train (3), the reversing gear (5) can be connected to the above-water transmissions (14, 24) via universal shafts (300, 301).

* * * * *